(12) United States Patent
Pearson et al.

(10) Patent No.: US 8,226,163 B1
(45) Date of Patent: Jul. 24, 2012

(54) AIRCRAFT DIVAN

(75) Inventors: Michael F. Pearson, Marinette, WI (US); Kurt F. Breuer, Marinette, WI (US)

(73) Assignee: Goodrich Corporation, Charlotte, NC (US)

( * ) Notice: Subject to any disclaimer, the term of this patent is extended or adjusted under 35 U.S.C. 154(b) by 394 days.

(21) Appl. No.: 12/367,231

(22) Filed: Feb. 6, 2009

(51) Int. Cl.
*B60N 2/427* (2006.01)
(52) U.S. Cl. ............... 297/216.2; 297/216.17; 296/68.1
(58) Field of Classification Search .............. 244/118.5, 244/118.6, 122 R; 297/216.1, 216.16, 216.17, 297/216.2; 296/68.1
See application file for complete search history.

(56) References Cited

U.S. PATENT DOCUMENTS

| 3,532,379 | A | * | 10/1970 | Reilly et al. | 297/216.17 |
| 3,582,133 | A | * | 6/1971 | DeLavenne | 296/68.1 |
| 3,603,638 | A | * | 9/1971 | McGregor et al. | 297/216.2 |
| 3,985,388 | A | * | 10/1976 | Hogan | 244/122 R |
| 4,720,139 | A | * | 1/1988 | McSmith | 297/216.2 |
| 5,538,117 | A | * | 7/1996 | Bouchez | 188/371 |
| 5,730,492 | A | * | 3/1998 | Warrick et al. | 297/216.2 |
| 6,024,406 | A | * | 2/2000 | Charras et al. | 297/216.14 |
| 6,053,571 | A | * | 4/2000 | Faigle | 297/216.13 |
| 7,070,236 | B2 | * | 7/2006 | Kawashima | 297/216.14 |
| 2004/0183344 | A1 | * | 9/2004 | Glance et al. | 297/216.1 |

* cited by examiner

*Primary Examiner* — Peter R. Brown
(74) *Attorney, Agent, or Firm* — Jerry J. Holden; John D. Titus

(57) ABSTRACT

An extendable leg for use in an aircraft seat can be coupled to an individual seat or a divan or bench. The extendable leg includes an exterior leg and an interior leg that are coupled together through a slot in the interior leg that is traversed by a bolt or cross member that is integrally formed with or sits through a set of holes defined by the exterior leg. The slot tapers towards the upper end. When the leg to extends and the bolt or cross member travels up the slot, the materials of the interior leg deform as the slot narrows until the stop or bushing is reached. The extendable leg may also have a mounting mechanism at the bottom that couples the leg to a cabin floor and enables one or two arcs of rotation to further diminish the sheering forces on the cabin floor.

8 Claims, 6 Drawing Sheets

AIRCRAFT DIVAN

BACKGROUND

1. Field of the Invention

The embodiments of the invention relate to a seat for a vehicle. Specifically, the embodiments of the invention relate to a divan or bench seat for an aircraft.

2. Background of the Invention

Aircraft seats are typically installed in aircraft as individual seats or in groups of seats such as rows of two or three seats. These seats are bolted to the floor of the cabin on an aircraft. The seats and floor are bolted together at each of the corners of the seat where the support structures such as a set of legs are in contact with the floor of the cabin. These support structures are rigid and together, as a group, are designed to support the weight of the occupant of the seat and to secure the seat to the cabin floor.

The rigid nature of the support structures and the manner in which they are bolted to the cabin can place a high sheer stress on the floor of the cabin and the bolts of the legs in the event of a sudden change of direction of the aircraft such as an emergency landing or crash landing. As a result, there is a high probability that the seat will become dislodged from the floor of the cabin or the floor of the cabin will become deformed thereby decreasing the safety of the passengers during the event that caused the deformation of the floor or dislocation of the seat.

The safety of the passengers is also diminished subsequent to the event when the passengers seek to exit the airplane. The deformation of the cabin floor and dislocation of the seats can impede the progress of the passengers as they attempt to find an exit from the airplane. In addition, emergency items are stored underneath the seats. These items can include life rafts, life vests, and similar emergency equipment. If the chair has been dislocated or the floor deformed, these items may become trapped or damaged between the bottom of the seats and the floor. This also decreases the safety of the passengers as they will be unable to easily remove these items in case of an emergency landing or crash landing.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
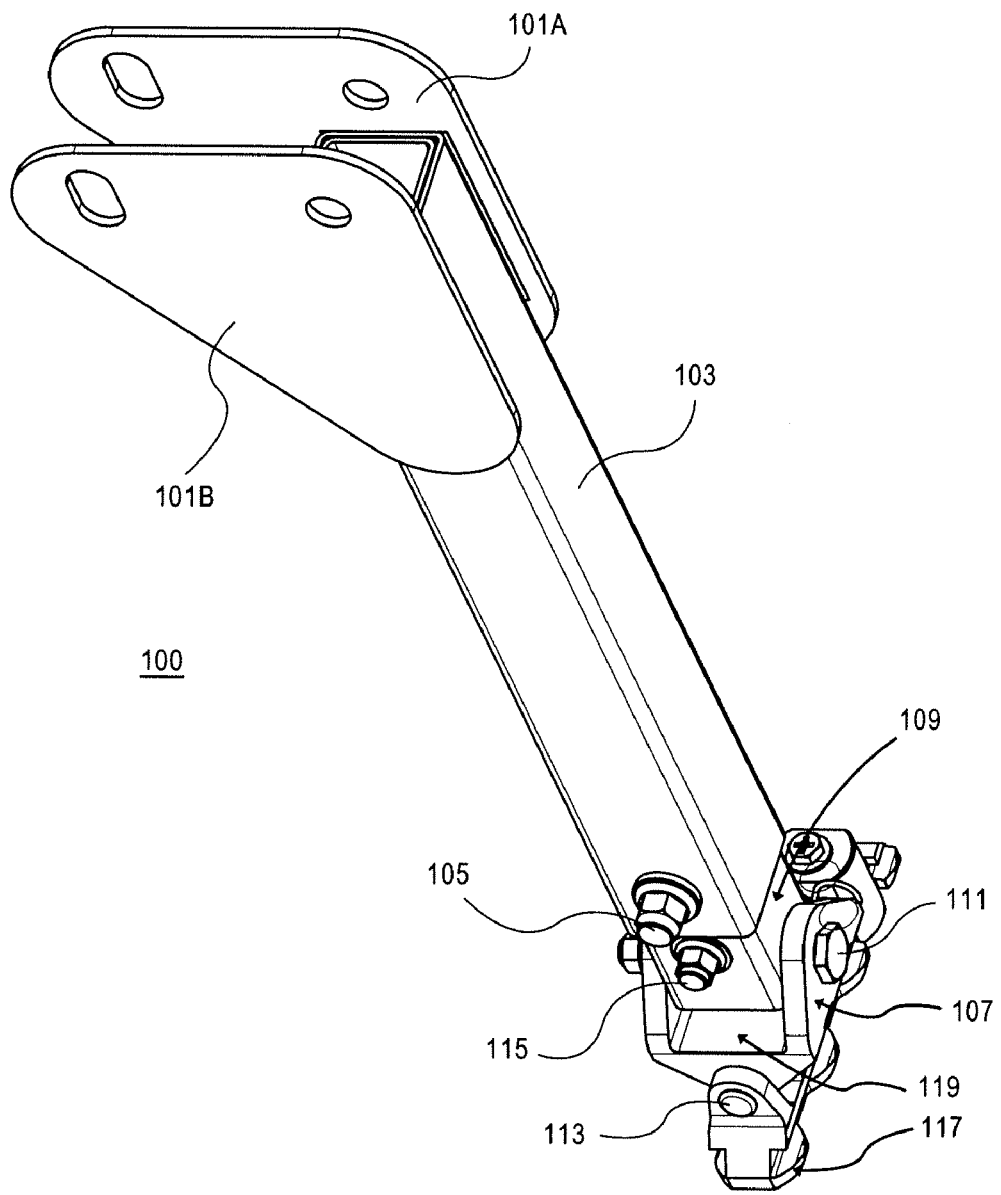
FIG. 1 is a diagram of one embodiment of an extendable leg support.

FIG. 1 is a diagram of one embodiment of an extendable leg support. The extendable leg support 100 includes a seat mounting mechanism 101A, 101B, an exterior leg member 103, an interior leg member 109 and a floor mounting mechanism 107. The exterior member 103 is slidably disposed over the interior member 109 in a telescoping relationship. The extendable leg 100 can have any size or dimensions. In one embodiment, the collapsed or non-extended state of the extendable leg 100 has a length of approximately four to eight inches. In the extended state, the extendable leg 100 has an approximate length of six to twelve inches. The components of the extendable leg 100 can be formed from steel, titanium, alloys thereof or similar lightweight materials having a high material strength. In one embodiment, the materials are capable of withstanding sheering and axial forces generated during a sixteen G pulse or impact. Sixteen G pulses are often utilized as a benchmark in the testing of aircraft components. The extendable leg 100 is designed to dissipate the forces acting upon the aircraft seat by the extension or telescoping of the leg thereby reducing the sheering and axial forces on the leg and cabin floor and increasing the likelihood that the aircraft seat will not be dislodged and the cabin floor will not be deformed or damaged. Avoiding this dislodgement, deformation and damage improves the safety of the occupants during and after an event.

In one embodiment, the extendable leg 100 includes a seat mounting mechanism 101A, 101B. The seat mounting mechanism 101A, 101B can be a set of plates that are bolted, welded or similarly fit or attached to the extendable leg 100. These plates 101A, 101B define a set of holes through which bolts are placed or similar attached mechanisms are utilized in conjunction with corresponding holes or structures in the frame of the seat. The plates 101A, 101B can have any number of attachment points and can be secured to the frame of the seat by any number of bolts or similar attachment mechanisms or structures. In another embodiment, the plates are welded onto the frame of the aircraft seat or similarly attached to the aircraft seat. In a further embodiment, the extendable leg 100 can be directly mounted onto the frame of the seat using any number of bolts, rivets, inter-locking mechanisms, form fit, welding or similar attachment mechanisms, structures or techniques.

A floor mounting mechanism 107 couples the expandable leg 100 to the floor of the cabin. The floor mounting mechanism 107 is designed to be bolted, welded, riveted, screwed or similarly attached to the cabin floor. The floor mounting mechanism 107 includes a base 117 and a rotating mechanism 119. Each of the components of the floor mounting mechanism 107 can be formed from aluminum, titanium, steel, alloys thereof or similar lightweight and high strength materials. The base 117 defines the holes for bolts, screws or similar attachment mechanisms or structures or the attachment points for welding, riveting or similar attachment mechanisms. The rotating mechanism 119 couples the base 117 to the interior leg portion 109 of the extendable leg 100.

In one embodiment, the floor mounting mechanism 107 provides one or two different arcs of rotation to enable the aircraft seat to move in relation to the cabin floor and thereby dissipate sheering forces or distribute the sheering forces between the aircraft seat and the cabin floor. In one embodiment, the floor mounting mechanism 107 includes two axles 111 and 113 each enabling a separate arc of rotation. Each of the axles 111 and 113 enables the extendable leg 100 to move in approximately an 180 degree arc of rotation relative to the cabin floor. The first axle 113 mounts the base 117 of the floor mounting mechanism 107 to the rotating mechanism 119. The first axle 113 can be secured to the base by a bolt, clevis pin or similar component. Use of a clevis pin allows for easy detachment of the aircraft seat from the base 117 and cabin floor. The rotating mechanism 119 includes the second axle 111 that couples the rotating mechanism 119 to the extendable leg 100, specifically to the interior leg 109.

The exterior leg 103 is a hollow structure that is coupled to the leg 109 in a telescoping relationship, that is it is slidably disposed over the interior leg 109. The exterior leg 103 can be roughly rectangular, cylindrical or similarly shaped. The exterior leg 103 is coupled to the interior leg 109 through an interlocking mechanism such as a bolt 105, cross member or similar attachment mechanism. The attachment of the interior leg 109 and the exterior leg 103 is described in greater detail herein below.

The interior leg 109 can also be a hollow structure. The interior leg 109 has a shape and dimensions that allow it to fit within exterior leg 103 without excessive lateral movement. The interior leg 109 also includes a bolt 115 or similar component. The bolt 115 provides additional support to the structure of the interior leg 109. The bolt 115 also provides support for a stop mechanism within the interior leg 109 that limits the downward movement of the exterior leg 103 relative to the interior leg 109.

Figure 2:
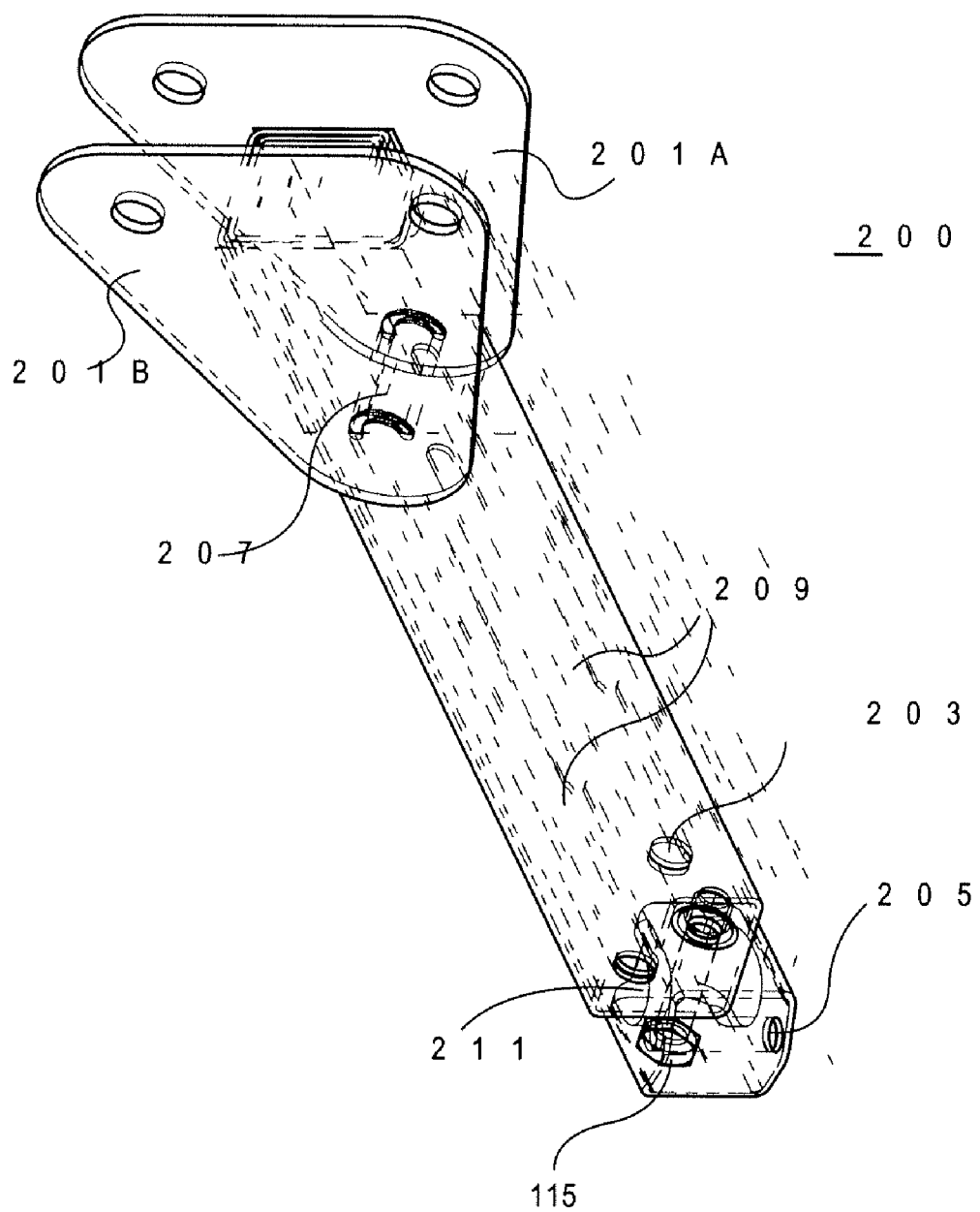
FIG. 2 is a diagram of another embodiment of an extendable leg support.

FIG. 2 is a diagram of another embodiment of the extendable leg 200. The extendable leg 200 is illustrated to show the internal components of the extendable leg 200. The extendable leg 200 includes a set of seat mounting mechanisms 201A, 201B, an internal stop bushing 207, a set of slots 209, a set of holes 203 for receiving an attachment mechanism 203, an internal stopping mechanism 211 and a set of holes 205 for coupling the internal leg to the floor mounting mechanism. Each of these components can be formed from aluminum, titanium, steel, alloys thereof and similar lightweight materials with high material and tensile strength. The components of this embodiment are analogous to those of FIG. 1, except that a distinct set of seat mounting plates are utilized. This embodiment can be attached to different portions of the seat frame such as interior sections, whereas the embodiment of FIG. 1 can be attached at the edges or ends of the seat frame.

The seat mounting mechanism 201A, 201B is a set of plates that are bolted, welded, riveted, screwed or similarly attached to the exterior leg of the extendable leg 200. The set of plates 201A, 201B define a set of holes for receiving bolts, screws or similar attachment mechanisms to couple the extendable leg 200 to a frame of an aircraft seat. The plates 201A, 201B can define any number of holes or similar receiving components. The plates 201A, 201B are triangular in shape, but could have any shape with sufficient surface area to accommodate the attachment mechanisms for the extendable leg 200 and the aircraft seat frame.

An internal bushing stop structure 207 is disposed within the interior leg to limit the upward movement of the bolt, cross member or similar attachment mechanism that couples the exterior leg to the interior leg. During periods where extreme forces are acting on the extendable leg 200 from testing, crashing or similar events, a bolt, cross member or similar mechanism that couples the exterior leg to the internal leg may traverse the set of slots 209 toward the bushing 207. The bushing 207 then limits further movement of the exterior and interior legs relative to one another by stopping the upward movement of the bolt, cross member or similar attachment mechanism.

The set of slots 209 in the interior leg are aligned with a hole 203 defined by the exterior leg. The width of the slots 209 near the bottom end roughly match the diameter of the holes 203. The slots 209 taper as they near the bushing 207. The width of slots 209 narrows beyond the diameter of the bolt, cross member or similar attachment mechanism that is disposed through the slots 209 and the holes 203 and couples the interior leg to the exterior leg. When extreme forces are exerted on the aircraft seat, cabin floor and extendable legs, the exterior leg moves relative to the interior leg, causing the bolt, cross member or similar attachment mechanism to travel along the slots 209. As the bolt or similar attachment mechanism moves toward the bushing 207 it faces increased resistance from the materials of the internal leg, because the slot narrows such that the width is smaller than the diameter of the bolt or cross member. This requires further travel along the slot to increasingly deform the slot until the bolt or cross member meets the bushing 207. The narrowing or tapering of the slot provides increasing resistance to the travel of the bolt or cross member. Deformation of the slot dissipates the forces acting on the aircraft seat and extendable leg by conversion of the forces acting on the leg into the force required to deform the walls of the interior leg in this controlled manner.

The extendable leg mechanism 200 includes a load distribution mechanism 211. The load distribution mechanism 211 can be formed from aluminum, steel, titanium, alloys thereof, or similar high strength and low weight materials. The load distribution mechanism 211 reinforces the interior leg by distributing loads on the bolt or crossbar 115 and the bolt or crossbar disposed in holes 205 such that the path of least resistance for forces acting upon the extendable leg is the traversal of the slots 209 by the cross bar rather than the joint between the extendable leg and the base.

Figure 3:
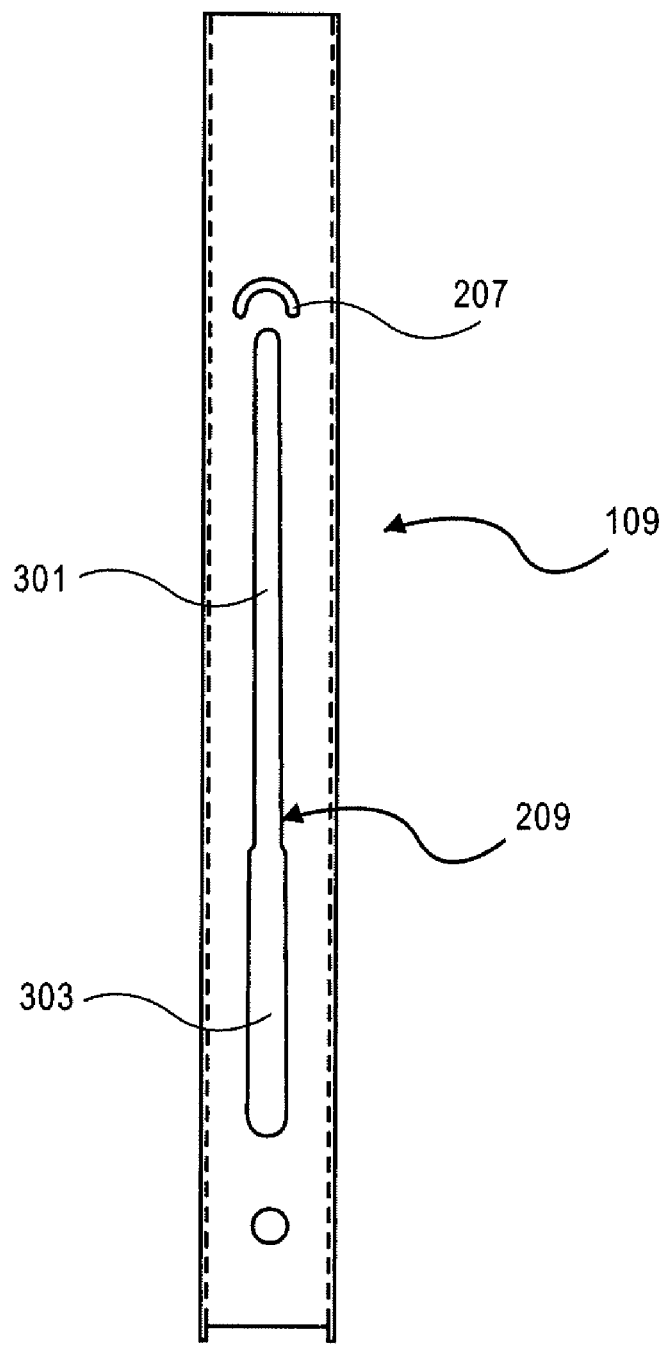
FIG. 3 is a diagram of one embodiment of an interior portion of the extendable leg support.

FIG. 3 is a diagram of one embodiment of the interior leg 109. The diagram is a side view that illustrates the interior structures including the bushing for stop 207. The diagram also illustrates that the slot 209 has a lower end 303 and upper end 301 where the diameter or thickness of the slot in the lower end 303 is wider than it is in the upper end 301. The change in the width of the slot can be constantly narrowing, a staged narrowing, combinations thereof or similar narrowing pattern. The width of the slots 209 narrows generally from the maximum width at the bottom of the slot 209 to a minimum width at the top of the slot 301. The interior leg 109 includes two slots, one slot on each opposite side of the interior leg 109. The slots 209 can have any length commensurate with the overall size of the extendible leg. The slots 209 are generally situated in a centralized position within the wall of the interior leg 109. Dependent on the width of the wall and the materials, the slots are offset from the sides or edges of the wall to prevent deformation or tearing that would allow the interior leg to become decoupled from the exterior wall or for the extendable leg to otherwise be damaged other than by the controlled deformation of the walls of the slots 209.

The illustrated embodiments place the slot 209 within the interior leg 209, which is hollow. However, one of ordinary skill in the art would understand that the principles, structures and functions described in relation to these embodiments are also applicable to other embodiments where the slots are placed in the exterior leg 203, where the interior leg 209 is not hollow and only defines a space for a cross member to traverse or that receives a fixed cross member that transverses the slots in the exterior leg 203 or similar variations. Other variations and permutations are not described at length for sake of clarity in presenting the invention, but are within the scope of the invention.

Figure 4A:
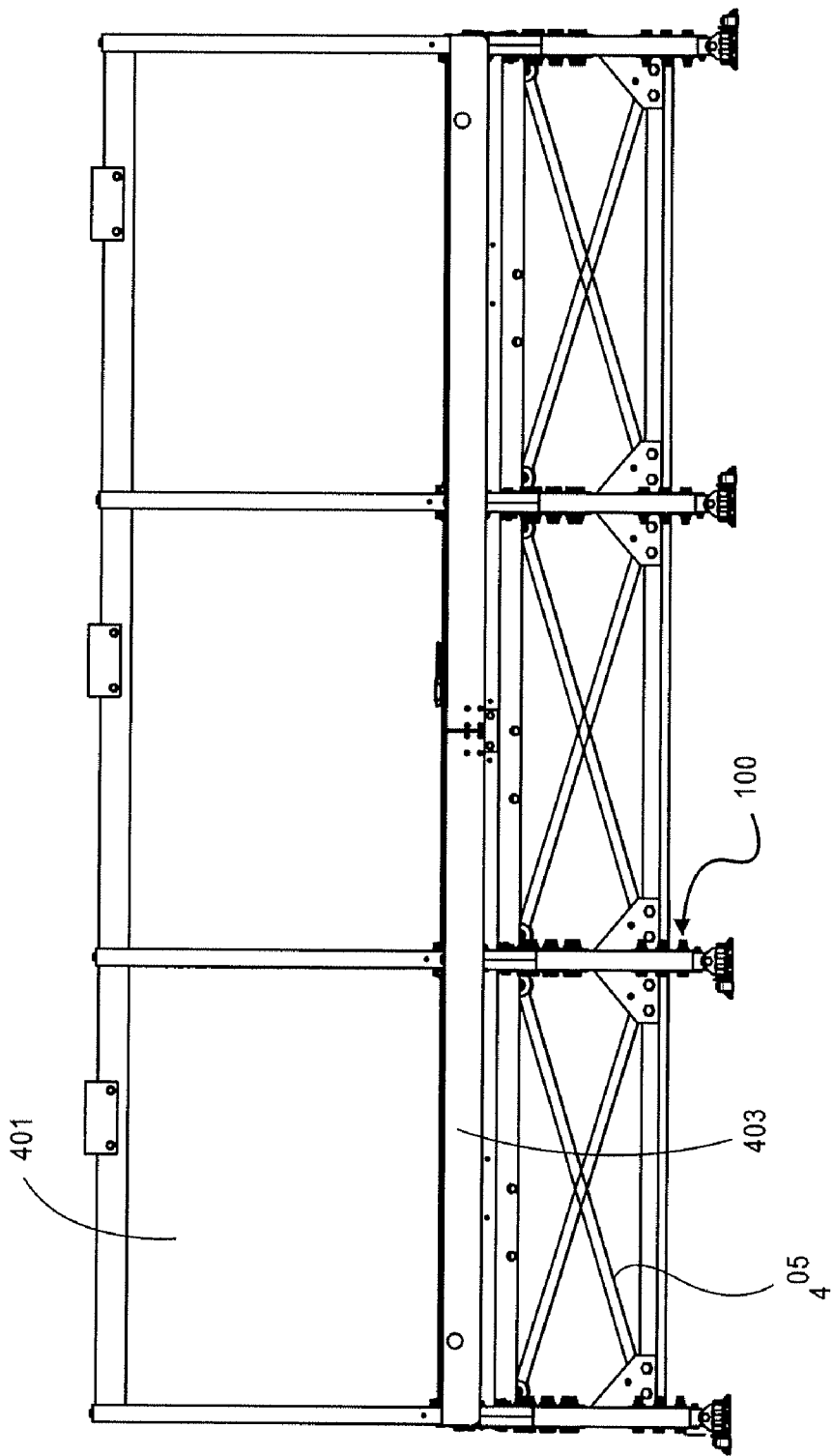
FIG. 4A is a diagram of one embodiment of a divan including extendable leg supports.

FIG. 4A is a diagram of one embodiment of a divan including the extendable leg. The divan is a combination or a set of aircraft seats forming a bench or similar grouping of individual seats. The divan includes a seat back 401, a seat 403, a support structure 405 and a set of extendable legs 100. The seat back 401, seat 403 and support structure 405 can be formed of similar materials to that of the extendable leg namely steel, titanium, alloys thereof or similar lightweight and high strength materials. The seat back 401 and seat 403 can have any size or dimensions appropriate for an aircraft. The seat back 401 and seat 403 can be formed from multiple panels and supports or long continuous panels and supports. Similarly, any number of seats can be coupled together including combinations of two, three, four, five and six seats. The divan can define discrete seats or a general bench that is designed to seat a discrete number of passengers. Sets of extendable legs 100 are shared between each of the individual seats or can be spaced out along the length of the bench to support the weight of the number of individuals for which the bench was designed. This reduces the number of extendable legs and parts needed to assemble the divan in comparison to the number needed for individual seats to accommodate the same number of individuals. The extendable legs 100 are spaced apart from one another at a distance of one half to three feet apart. In another embodiment, the extendable legs 100 are used as part of an individual seat and are placed at least at the corners of the individual seat.

The support structure 405 includes any number of cross members forming a lattice work or similar support structures to distribute the weight of the seat and seat back as well as the occupant over the set of extendable legs 100. The support structure 405 can include cross members, supports or similar structures that link each of the extendable legs 100. The support structure 405 can also include cross members, supports or similar structures that connect the extendable legs 100 to the seat or seat back. Additional features and components of the support structure 405 are discussed herein below in regard to FIG. 4B.

Figure 4B:
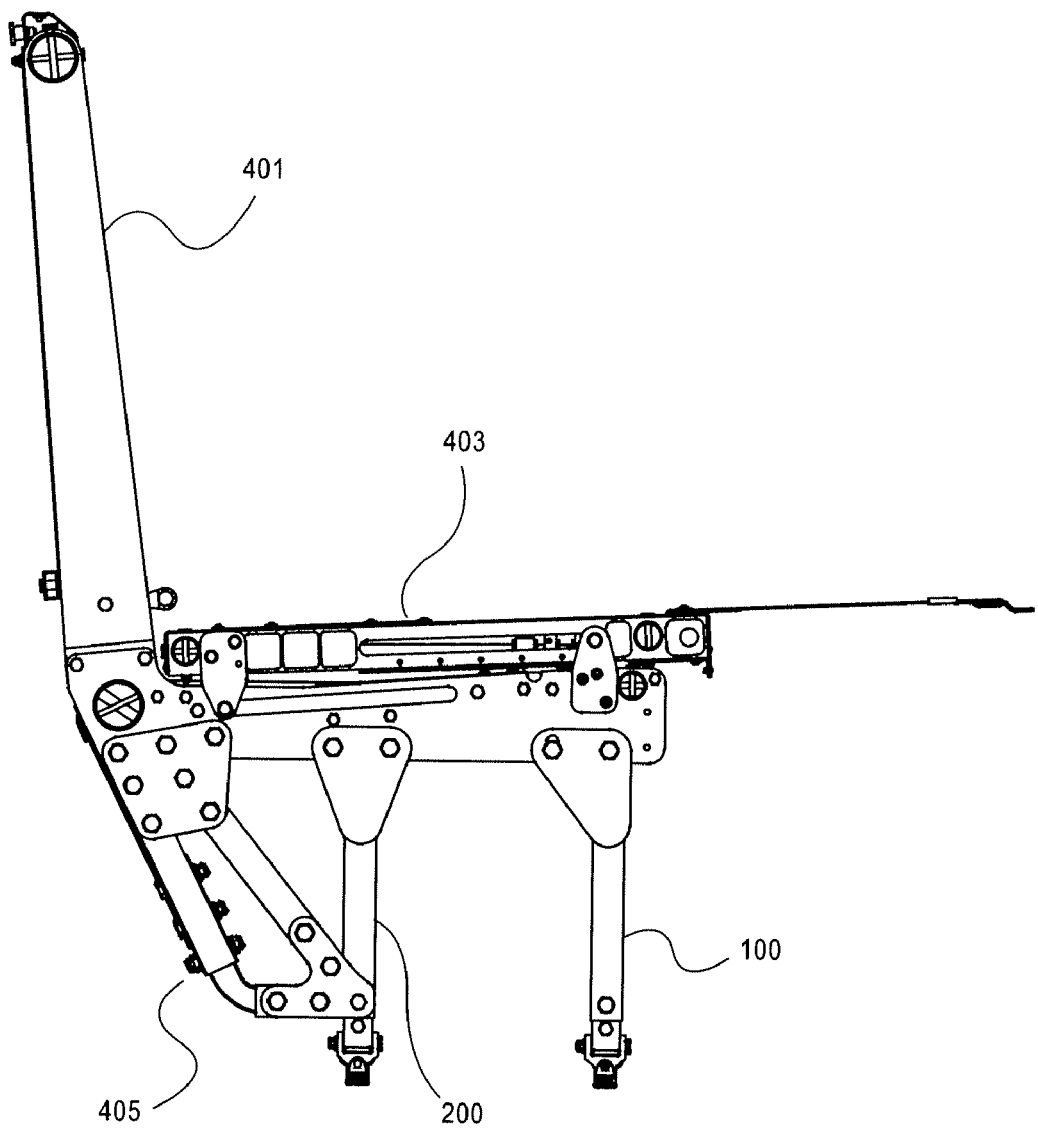
FIG. 4B is a side view of one embodiment of the divan including the extendable leg supports.

FIG. 4B is a side view of one embodiment of the divan. The side view illustrates additional features of one embodiment of the seat back 401, seat 403 and support structure 405. The seat back 401 can have any width, height or length dependent on the occupancy and similar requirements for the seat. Similarly, the seat back 401 can be positioned to have any distance from the front edge of the seat 403. The seat 403 can have any depth and any thickness. The seat back 401 and seat 403 define an individual seat or a bench upon which an occupant or set of occupants can sit. The support structure 405 distributes the weight from the seat 403 and seat back 401 over the set of extendable legs 100 and 200. The support structure 405 can be directly coupled to the back set of extendable legs 200. In another embodiment the support structure 405 can also be coupled to the front set of 100 of extendable legs. The seat back 401 and seat 403 can also include additional mechanisms and functionality including positional adjustment, reclining, collapsibility and similar features. The incorporation of these features would be understood by one of ordinary skill in the art and discussion of these features has been omitted for sake of clarity.

Figure 5:
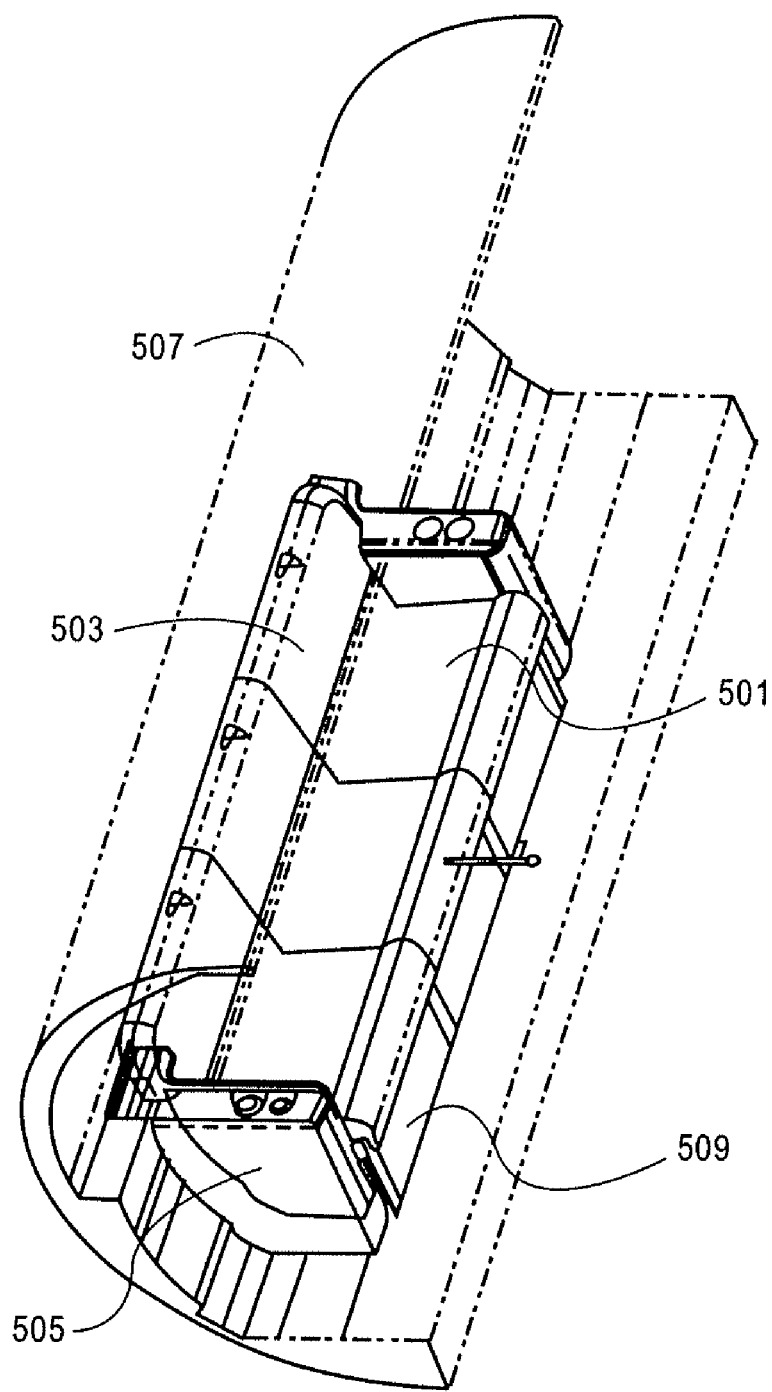
FIG. 5 is a diagram of one embodiment of the divan in the context of an aircraft fuselage.

FIG. 5 is a diagram of one embodiment of the divan and contents of an aircraft fuselage. The divan is illustrated as a completed bench or set of seats. The divan includes a seat 501, seat back 503, leg rest or an under seat compartment 509, arms 505 and similar components. The divan may be situated against an outer wall 507 of the fuselage or may be set up as a row perpendicular to the outer wall of the fuselage 507. In the embodiment where the divan is situated against a wall, the divan can be additionally mounted to the wall in addition to being mounted to the floor of the cabin. The divan can also be positioned against and mounted to interior walls of the cabin.

The seat back 503 or seats 501 are covered with cushioning in the form of upholstered foam or similar padding or similarly adorned to improve the comfort of the occupants. The under seat compartment 509 can be enclosed by a panel or an extendable footrest 509. The under seat compartment 509 can provide storage for life vests, life rafts and similar emergency equipment. The extendable legs protect the under seat compartment from being compressed by dissipating axial and sheering forces and similar energy through extension of the legs and thereby prevent damage to the contents of the under seat compartment.

The arm rest 505 can be attached to each end of the divan to provide a space for the placement of multi media controls such as audio and video controls, attendant service buttons, temperature controls, environmental controls, as well as, cup holders, collapsible tables and similar conveniences. Any number and combination of these features can be included in the arm rest structure. In another embodiment, arm rests and similar components can be situated in the middle or within the divan to define individual seats. Any number of arm rests can be included in the divan to define individual seats.

In the foregoing specification the invention has been described with reference to specific embodiments thereof. It will however be evident that various modifications and changes can be made thereto without departing from the broader spirit and scope of the invention as set forth in the appended claims. The specification and drawings are accordingly to be regarded as an illustrative rather than in a restrictive sense.

What is claimed is:

1. A vehicle seat capable of being mounted to the floor of a vehicle, the vehicle seat comprising:
    a first seat having a frame and a first seat pan defining a surface on which an occupant can sit, the seat further comprising a front edge and a rear edge opposite the front edge;
    a first seat back coupled to the frame proximal the rear edge of the seat;
    a first extendable leg coupled between the floor and the frame along the front edge of the seat;
    a second seat comprising a second seat pan and a second seat back coupled to the frame, wherein the first seat back, first seat pan, second seat back and second seat pan form a divan;
    said first extendable leg comprising a first structure, a second structure and an interlocking mechanism, the second structure being coupled to the first structure in a telescopic relationship moveable from a shortened position to an elongated position as the frame moves away from the floor, the second structure defining a slot that tapers toward a first end of the second structure, the slot receiving the interlocking mechanism and providing increasing resistance to the interlocking mechanism as the extendable leg extends from the shortened position to the elongated position;
    a mounting mechanism interposed between the first extendable leg and the frame; and
    a second extendable leg coupled between the floor and the frame along the rear edge of the seat.

2. The vehicle seat of claim 1, further comprising:
    a stop structure positioned within the second structure to limit movement of the extendable leg to a predetermined maximum elongation.

3. The vehicle seat of claim 1, wherein the interlocking mechanism comprises:
    a bolt or cross member.

4. The vehicle seat of claim 1, further comprising:
    a second mounting mechanism interposed between the floor and the first extendable leg, the second mounting mechanism comprising a gimbal having a rotation mechanism to allow a range of movement along a first axis and a base coupled to the rotation mechanism to allow a range of movement along a second axis.

5. The vehicle seat of claim 1, wherein:

The first extendable leg is oriented substantially vertical relative to the floor.

6. A vehicle seat capable of being mounted to the floor of a vehicle, the vehicle seat comprising:
- a first seat having a frame, a seat back, and a seat pan defining a surface on which an occupant can sit, the seat further comprising a front edge and a rear edge opposite the front edge;
- at least two extendable legs coupled between the floor and the frame, one of said at least two extendable legs located along the front edge and one of said at least two extendable legs located along the rear edge of the seat, each of said at least two extendable legs comprising an exterior section and an interior section, the interior section arranged to telescope within the exterior section thereby telescoping each of the at least two extendable legs from a shortened position to a lengthened position as the seat frame proximal each of said at least two extendable legs moves away from the floor;
- an energy dissipating mechanism coupled between the exterior section and the interior section of each of said at least two extendable legs;
- a mounting mechanism coupled to each of said at least two extendable legs to securely couple the vehicle seat to a vehicle;
- a third extendable leg coupled between the floor and the frame proximal the front edge of the seat and a fourth extendable leg coupled between the floor and the frame proximal the rear edge of the seat, each of said, third and fourth extendable legs comprising an exterior section and an interior section, the interior section arranged to telescope within the exterior section thereby telescoping the extendable leg from a shortened position to a lengthened position, and an energy dissipating mechanism coupled between the exterior section and the interior section, the energy dissipating mechanism comprising a cross member engaging a tapered slot, such that the cross member deforms the tapered slot as the extendable leg is moved from the shortened position to the lengthened position.

7. The vehicle seat of claim 6, wherein:

Each of said at least two extendable legs is oriented substantially vertical relative to the floor.

8. The vehicle seat of claim 7, wherein:

the energy dissipating mechanism comprises a cross member engaging a tapered slot, such that the cross member deforms the tapered slot as each of said at least two extendable legs is moved from the shortened position to the lengthened position.

\* \* \* \* \*